US011317771B2

(12) United States Patent
Lai

(10) Patent No.: US 11,317,771 B2
(45) Date of Patent: May 3, 2022

(54) DECONTAMINATION APPARATUS FOR VIEWING WINDOW

(71) Applicant: Thuncloud Inc., Taichung (TW)

(72) Inventor: Aling Lai, Taichung (TW)

(73) Assignee: Thuncloud Inc., Taichung (TW)

( * ) Notice: Subject to any disclaimer, the term of this patent is extended or adjusted under 35 U.S.C. 154(b) by 3 days.

(21) Appl. No.: 16/996,642

(22) Filed: Aug. 18, 2020

(65) Prior Publication Data

US 2020/0375418 A1 Dec. 3, 2020

Related U.S. Application Data

(63) Continuation-in-part of application No. 15/976,010, filed on May 10, 2018, now abandoned.

(30) Foreign Application Priority Data

May 19, 2017 (TW) ................................ 106116571

(51) Int. Cl.

| | |
|---|---|
| ***B08B 1/04*** | (2006.01) |
| ***A47L 1/06*** | (2006.01) |
| ***B23Q 11/00*** | (2006.01) |
| *B08B 1/00* | (2006.01) |

(52) U.S. Cl.

CPC .................. *A47L 1/06* (2013.01); *B08B 1/04* (2013.01); *B23Q 11/00* (2013.01); *B08B 1/005* (2013.01)

(58) Field of Classification Search

CPC ....... G02B 27/0006; B08B 17/02; B08B 1/00; B08B 1/005; A47L 1/06; B23Q 11/00

See application file for complete search history.

(56) References Cited

U.S. PATENT DOCUMENTS

| | | | | |
|---|---|---|---|---|
| 7,104,657 B2 * | 9/2006 | Sherwin | ................. | G03B 11/00 359/511 |
| 2002/0017004 A1 * | 2/2002 | Nakajima | ............. | B60S 1/0494 15/250.201 |

FOREIGN PATENT DOCUMENTS

| | | |
|---|---|---|
| CN | 101796481 A | 8/2010 |
| CN | 204261450 U | 4/2015 |
| TW | M246636 U | 8/2003 |

* cited by examiner

*Primary Examiner* — Jade R Chwasz

(74) *Attorney, Agent, or Firm* — Bradley J. Thorson; DeWitt LLP

(57) ABSTRACT

A decontamination apparatus for a viewing window includes a cylinder and a rotating module disposed at one end of the cylinder. The rotating module is connected with a viewing window. The rotating module can be driven to rotate, which further drives the viewing window to rotate for removing dirt attached to the viewing window. Besides, a decontamination apparatus for a viewing window includes a cylinder connected with a viewing window and a rotating module disposed at one end of the cylinder. The rotating module is connected with a wiper in contact with the viewing window. The rotating module can be driven to rotate, which further drives the wiper to turn for removing dirt attached to the viewing window.

1 Claim, 8 Drawing Sheets

211A 224A 225A 1A 223A 222A 22A 24A 2A 221A 21A 31 25A 23A 11A 4 3

3 2C 227C 226C 13C 221C 222C 22C 223C

DECONTAMINATION APPARATUS FOR VIEWING WINDOW

CROSS-REFERENCE TO RELATED APPLICATIONS

This Application is being filed as a Continuation-in-Part of U.S. patent application Ser. No. 15/976,010, filed May 10, 2018, currently pending, which is based upon and claims priority under 35 U.S.C. 119 from Taiwan Patent Application No. 106116571 filed on May 19, 2017, which is hereby specifically incorporated herein by this reference thereto.

FIELD OF THE INVENTION

The present invention relates to a decontamination apparatus, and more particularly to a decontamination apparatus for removing water and dirt on a viewing window.

BACKGROUND OF THE INVENTION

Various optical image pickup devices, such as cameras, video cameras or monitors, comprise a lens assembly that is composed of a plurality of lenses arranged in a housing. However, in a rainy day or a foggy day, the outermost lens of the lens assembly (or a protection lens attached to the lens assembly) may have a phenomenon that water droplets are condensed and adhered to the lens, which will affect the imaging and generate an image obscured by the water droplet.

A common CNC automatic processing machine separates the processing area with a housing, which can limit the spraying range of the cutting fluid during processing. Wherein, the housing has a viewing window for the operator to observe the operating conditions inside the housing. However, the splattering of the cutting fluid may be adhered to the viewing window, which will result in the problem that the sight is obscured and the operator cannot observe the operating conditions clearly.

In order to solve the above problem, it is generally known to apply a water repellent film on the lens or the viewing window, thereby reducing the surface tension. Once a water droplet or dirt is condensed on the lens or the viewing window, it can quickly slide off and is hardly attached to the lens or the viewing window, thereby removing the water droplet or dirt. However, this way can only prevent larger water droplets or dirt from attaching to the lens or the viewing window. The smaller water droplets or dirt cannot overcome the surface tension and remains on the lens or the viewing window. It cannot completely improve the shortcoming of unclear or obscured sight. On the other hand, after being used a period of time, the coating film on the lens or the viewing window may crack or peel off, which deteriorates the effect of reducing the surface tension, so water droplets or dirt may be attached to the lens or the viewing window.

Accordingly, the inventor of the present invention has devoted himself based on his many years of practical experiences to solve these problems.

SUMMARY OF THE INVENTION

The primary object of the present invention is to provide a decontamination apparatus for a viewing window, which drives a rotor to rotate relative to a stator to remove the water droplets attached to the viewing window, thereby preventing the sight from being obscured.

According to one aspect of the present invention, a decontamination apparatus for a viewing window is provided. The decontamination apparatus comprises a cylinder and a rotating module. The rotating module is disposed at one end of the cylinder and connected with a viewing window. The rotating module can be driven to rotate, which further drives the viewing window to rotate for removing dirt attached to the viewing window.

Preferably, the rotating module includes a rotor unit and at least one stator unit. The stator unit is fixed to an outer side of the cylinder and wound with an energizable coil. The rotor unit is pivotally connected to the cylinder. The viewing window is fixed on the rotor unit. The rotor unit is provided with a permanent magnet opposite to the stator unit.

Preferably, a bearing is provided between the rotor unit and the cylinder. Furthermore, the rotor unit includes a first block, a second block and a third block threadedly connected in sequence. The first block is connected with the bearing. The second block is connected with the permanent magnet. The third block is connected with the viewing window.

According to another aspect of the present invention, a decontamination apparatus for a viewing window is provided. The decontamination apparatus comprises a cylinder and a rotating module. The cylinder is connected with a viewing window. The rotating module is disposed at one end of the cylinder and connected with a wiper in contact with the viewing window. The rotating module can be driven to rotate, which further drives the wiper to turn for removing dirt attached to the viewing window.

Preferably, the rotating module includes a rotor unit and at least one stator unit. The stator unit is fixed to an outer side of the cylinder and wound with an energizable coil. The rotor unit is pivotally connected to the cylinder. The wiper is fixed on the rotor unit. The rotor unit is provided with a permanent magnet opposite to the stator unit.

Preferably, a bearing is provided between the rotor unit and the cylinder. Furthermore, the rotor unit includes a first block, a second block and a third block threadedly connected in sequence. The first block is connected with the bearing. The second block is connected with the permanent magnet. The third block is connected with the wiper.

The first block, the second block, and the third block are all formed as an annular shape. The bearing is socketed to the cylinder. The first block is rotatable relative to the cylinder via the bearing. The second block is threadedly connected on an upper end of the first block. The permanent magnet is attached on the side of the second block and is faced to the stator unit. The third block is threadedly connected on an upper end of the second block. The viewing window is socketed to the third block. Therefore the second block and the third block are rotatable relative to the cylinder via the first block.

Besides, a water drain gap is formed between the lens and a bottom end of the first block.

DETAILED DESCRIPTION OF THE PREFERRED EMBODIMENTS

Embodiments of the present invention will now be described, by way of example only, with reference to the accompanying drawings.

Figure 1:
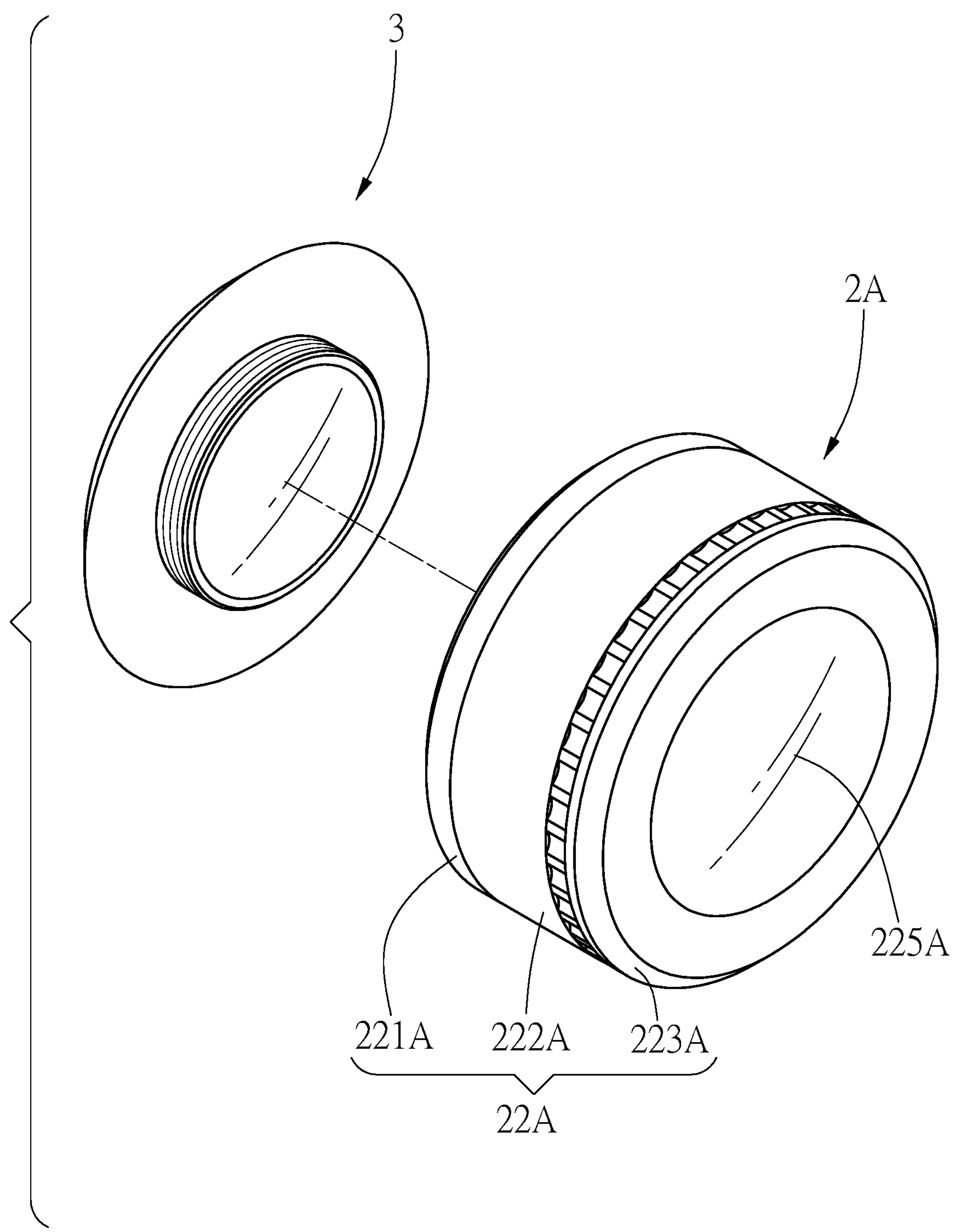
FIG. 1 is an exploded view in accordance with a first embodiment of the present invention.
Figure 2:
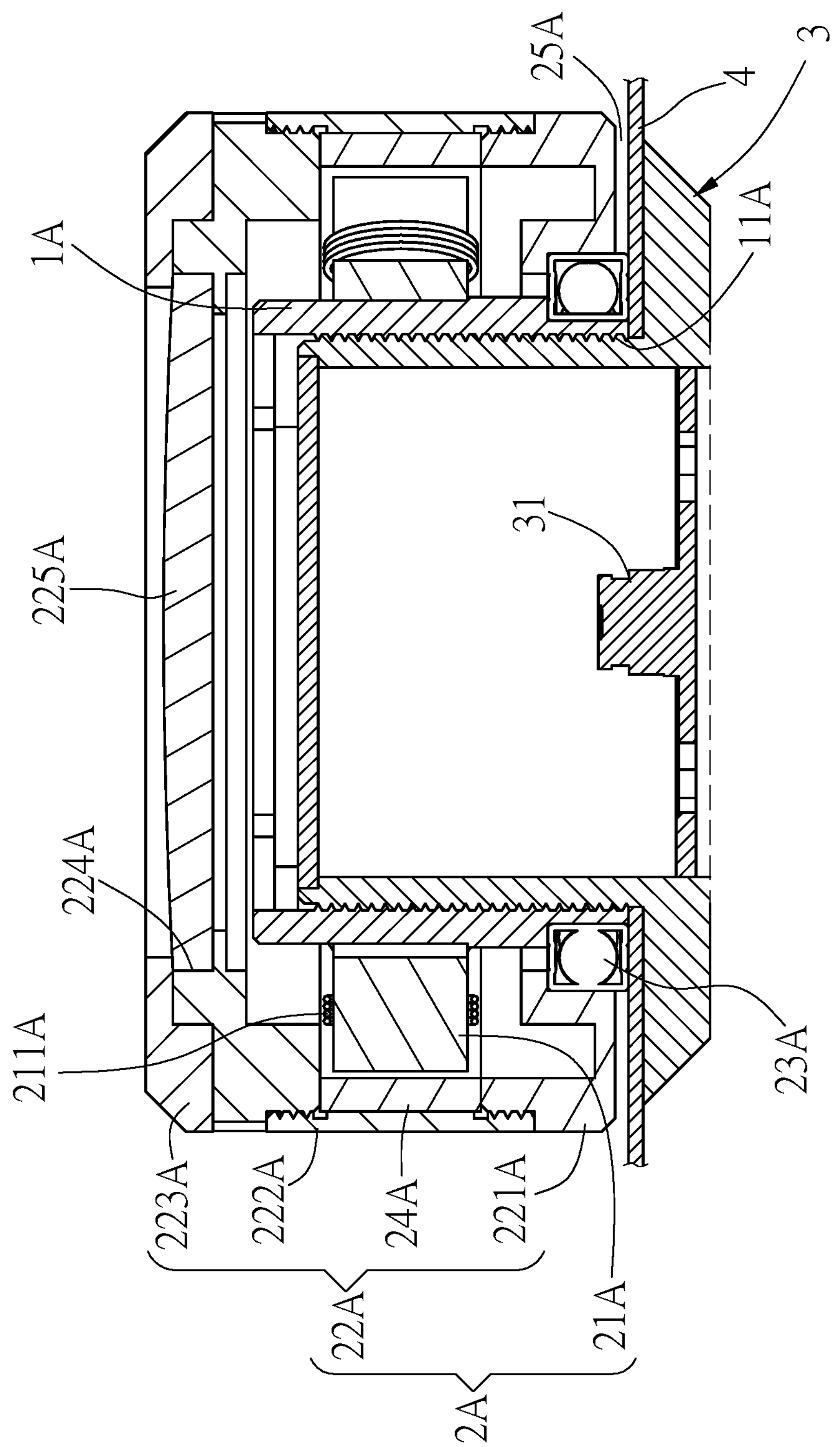
FIG. 2 is a sectional view in accordance with the first embodiment of the present invention.

FIGS. 1 and 2 show a decontamination apparatus for a viewing window in accordance with a first embodiment of the present invention. The decontamination apparatus is mounted on a lens 3 and comprises a cylinder 1A. One end of the cylinder 1A is provided with a connecting portion 11A (in this embodiment, the connecting portion is a screw thread) for connecting the lens 3. An imaging unit 31 is provided inside the lens 3. The imaging unit 31 is electrically connected to a circuit board (not shown) and further connected to an external connecting port (not shown). The lens 3 is socketed to a shell 4 of a CNC machine, the cylinder 1A is screwed with the lens 3, therefore the shell 4 is clamped between the lens 3 and the cylinder 1A.

The other end of the cylinder 1A is provided with a rotating module 2A. The rotating module 2A is provided with a viewing window 225A. In more detail, in this embodiment, the rotating module 2A includes a rotor unit 22A and at least one stator unit 21A. The stator unit 21A is annularly disposed on an outer side of the cylinder 1A. The stator unit 21A is wound with an energizable coil 211A. The rotor unit 22A is formed in an annular shape and surrounds the cylinder 1A, and is pivotally connected to the cylinder 1A through a bearing 23A so that the rotor unit 22A can be rotated relative to the cylinder 1A. One end of the rotor unit 22A is formed with an opening 224A. The viewing window 225A is disposed in the opening 224A to seal the opening 224A.

A permanent magnet 24A is provided on the rotor unit 22A at a position opposite to the stator unit 21A. Accordingly, when the coil 211A on the stator unit 21A is energized, an induced magnetic field is generated, and by interaction with the magnetic force of the permanent magnet 24A, the rotor unit 22A can be rotated relative to the cylinder 1A.

In this embodiment, the rotor unit 22A has a first block 221A, a second block 222A, and a third block 223A. The three blocks are threadedly connected in sequence. Wherein, the bearing 23A is connected to the first block 221A. The permanent magnet 24A is disposed on the second block 222A. The viewing window 225A is fixed on the third block 223A. These three blocks are assembled sequentially to form the rotor unit 22A, and then the rotor unit 22A is assembled to the cylinder 1A.

In the present invention composed of the above components, because the viewing window 225A is located on the outside of the lens 3, water droplets such as rain or dew condensation will adhere to the viewing window 225A. When in use, an induced magnetic field is generated by electrically driving the coil 211A on the stator unit 21A, which in turn interacts with the permanent magnet 24A on the rotor unit 22A so as to drive the rotor unit 22A to rotate, and the rotor unit 22A drives the viewing window 225A to rotate synchronously. Accordingly, water droplets attached to the viewing window 225A are removed to make the image clearer. Furthermore, in the present invention, a water repellent film may be coated on the viewing window 225A, thereby reducing the surface tension of the viewing window 225A and further enhancing the ability to remove water droplets.

Moreover, the first block 221A, the second block 222A, and the third block 223A are all formed as an annular shape. The bearing 23A is socketed to the cylinder 1A. The first block 221A is rotatable relative to the cylinder 1A via the bearing 23A. The second block 222A is threadedly connected on an upper end of the first block 221A. The permanent magnet 24A is attached on the side of the second block 222A and is faced to the stator unit 21A. The third block 223A is threadedly connected on an upper end of the second block 222A. The viewing window 225A is socketed to the third block 223A. Therefore the second block 222A and the third block 223A are rotatable relative to the cylinder 1A via the first block 221A. According to the connecting portion 11A is screwed with the lens 3, the fastening range between the cylinder 1A and the lens 3 is appropriately extended so that the cylinder 1A with the rotating module 2A is firmly connected to the lens 3. Thus, the rotating module 2A could be rotated at a high speed.

A water drain gap 25A is formed between the lens 3 and a bottom end of the first block 221A. Therefore, the condensation in the rotating module 2A could be guided out through the drain gap 25A.

Figure 3:
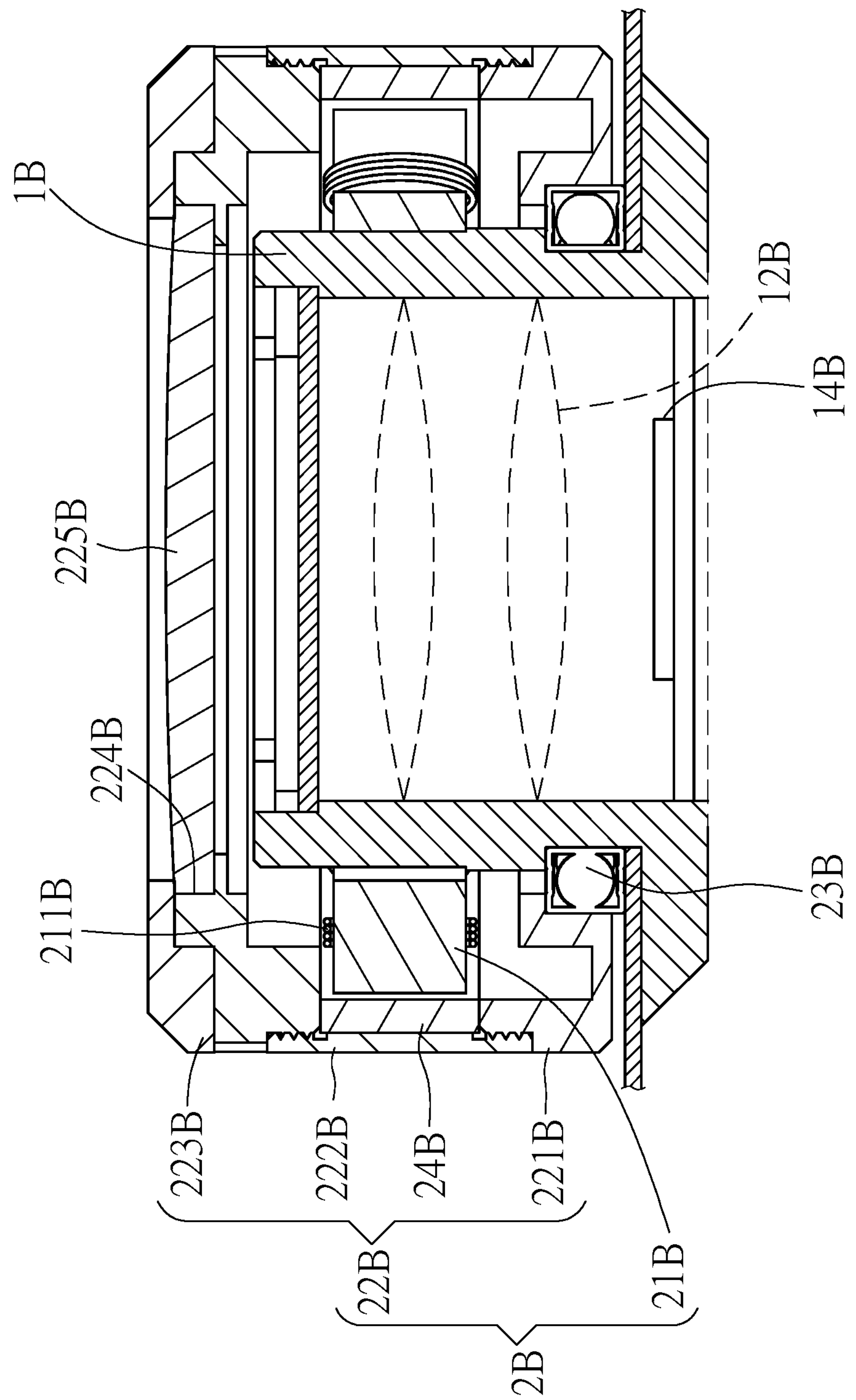
FIG. 3 is a sectional view in accordance with a second embodiment of the present invention.

FIG. 3 shows a second embodiment of the present invention, which is constructed together with a lens. The structure of this embodiment includes a cylinder 1B as a lens housing, and an imaging lens assembly 12B composed of a plurality of lenses is accommodated in the interior of the cylinder 1B. The cylinder 1B further includes an imaging chipset 14B therein. The imaging chipset 14B is electrically connected to a circuit board (not shown) and further connected to an external connecting port (not shown).

One end of the cylinder 1B is provided with a rotating module 2B. The rotating module 2B is provided with a viewing window 225B which can form a protective effect on the imaging lens assembly 12B. In more detail, in this embodiment, the rotating module 2B includes a rotor unit 22B and at least one stator unit 21B. The stator unit 21B is annularly disposed on an outer side of the cylinder 1B. The stator unit 21B is wound with an energizable coil 211B. The rotor unit 22B is formed in an annular shape and surrounds the cylinder 1B, and is pivotally connected to the cylinder 1B through a bearing 23B so that the rotor unit 22B can be rotated relative to the cylinder 1B. One end of the rotor unit 22B is formed with an opening 224B. The viewing window 225B is disposed in the opening 224B to seal the opening 224B.

A permanent magnet 24B is provided on the rotor unit 22B at a position opposite to the stator unit 21B. Accordingly, when the coil 211B on the stator unit 21B is energized, an induced magnetic field is generated, and by interaction with the magnetic force of the permanent magnet 24B, the rotor unit 22B can be rotated relative to the cylinder 1B.

In this embodiment, the rotor unit 22B has a first block 221B, a second block 222B, and a third block 223B. The three blocks are threadedly connected in sequence. Wherein, the bearing 23B is connected to the first block 221B. The permanent magnet 24B is disposed on the second block 222B. The viewing window 225B is fixed on the third block 223B. These three blocks are assembled sequentially to form the rotor unit 22B, and then the rotor unit 22B is assembled to the cylinder 1B.

In this embodiment, because the viewing window 225B is located on the outside of the imaging lens assembly 12B, water droplets such as rain or dew condensation will adhere to the viewing window 225B. When this embodiment is used, same as the foregoing first embodiment, an induced magnetic field is generated by electrically driving the coil 211B on the stator unit 21B, which in turn interacts with the permanent magnet 24B on the rotor unit 22B so as to drive the rotor unit 22B to rotate, and the rotor unit 22B drives the viewing window 225B to rotate synchronously. Accordingly, water droplets attached to the viewing window 225B are removed to make the image clearer.

Figure 4:
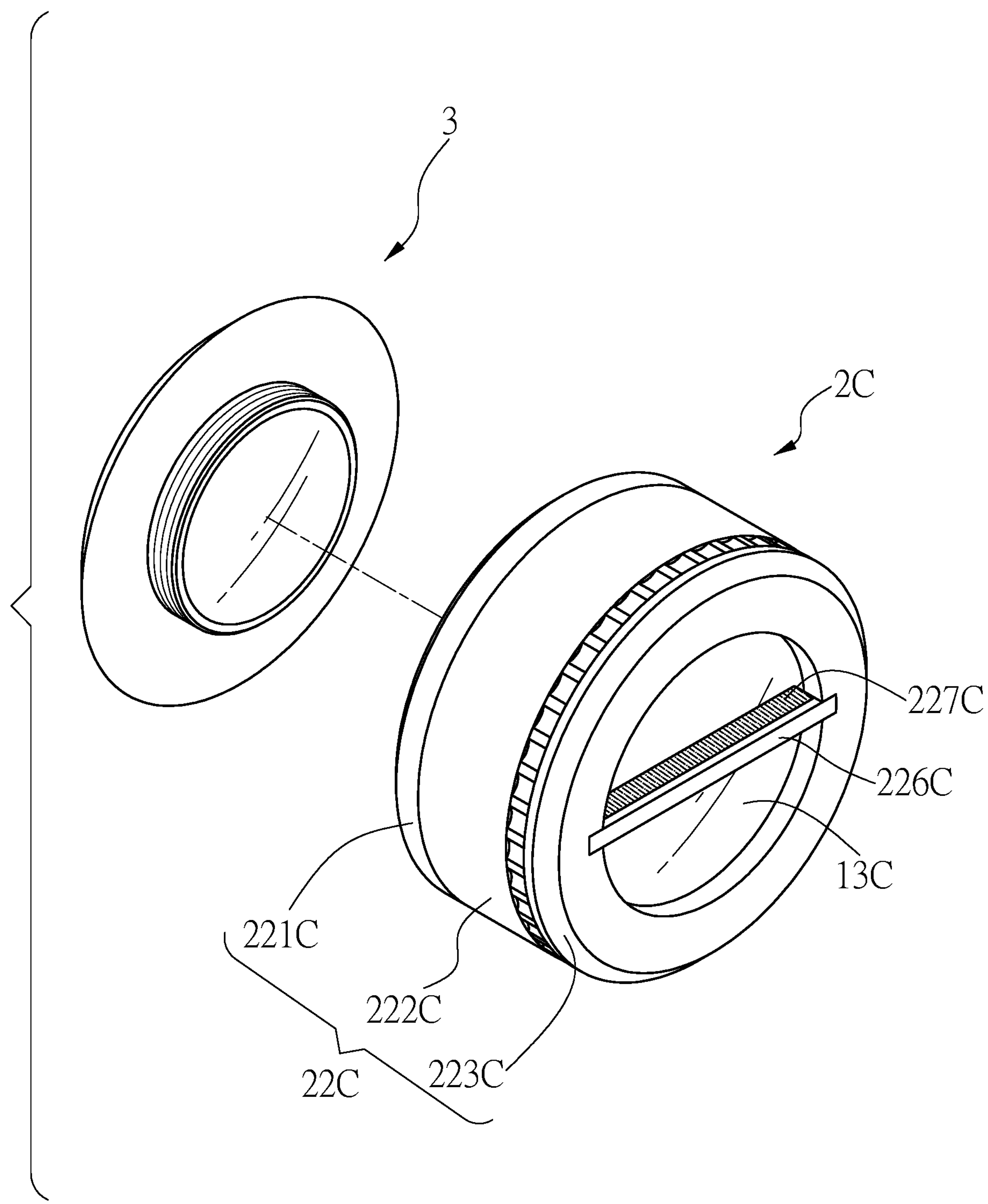
FIG. 4 is an exploded view in accordance with a third embodiment of the present invention.
Figure 5:
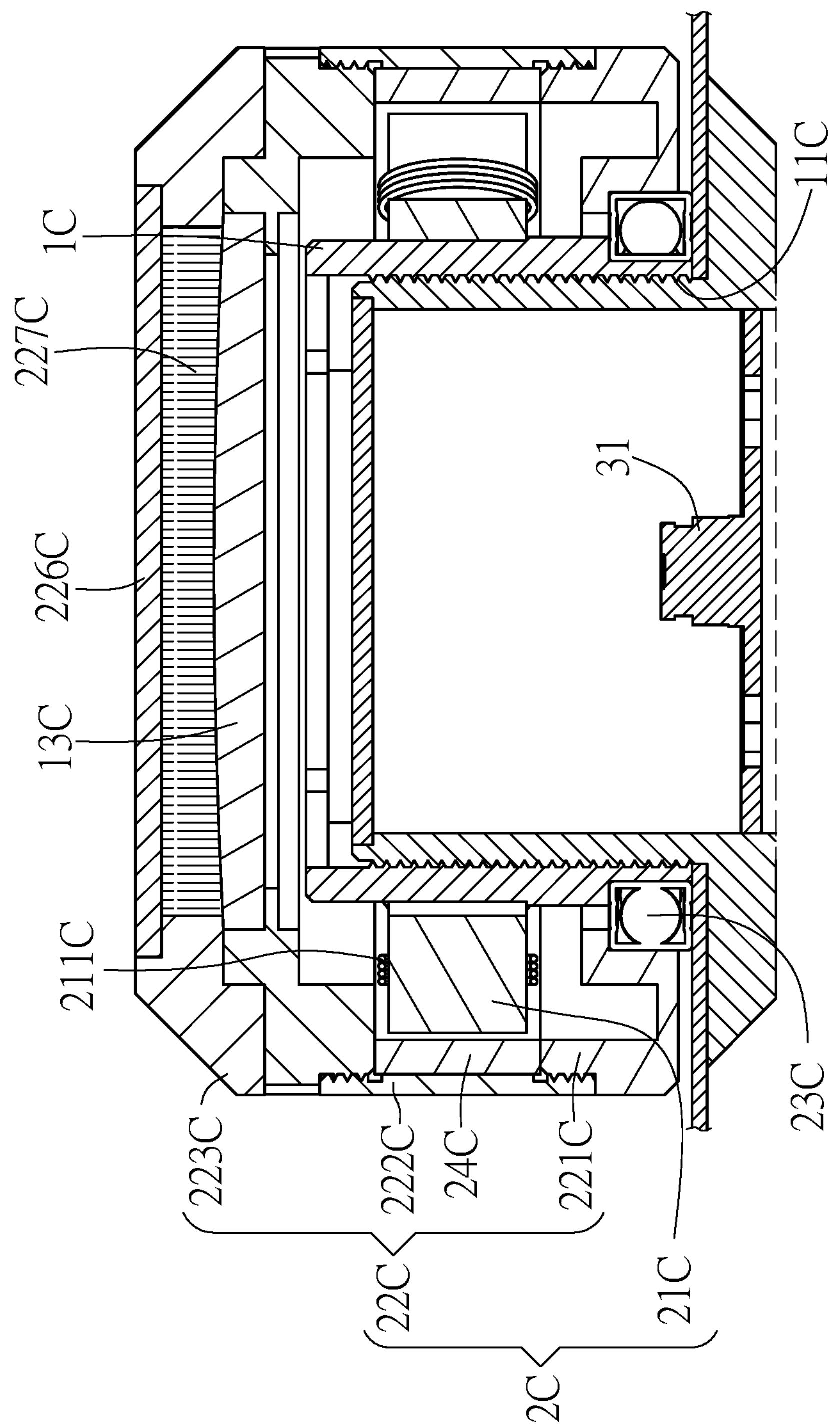
FIG. 5 is a sectional view in accordance with the third embodiment of the present invention.

FIGS. 4 and 5 show a third embodiment of the present invention, which is an add-on decontamination apparatus as the first embodiment. This embodiment is based on the foregoing first embodiment and has a slight structural change. The decontamination apparatus comprises a cylinder 1C. One end of the cylinder 1C is provided with a connecting portion 11C (in this embodiment, the connecting portion is a screw thread) for connecting a lens 3. An imaging unit 31 is provided inside the lens 3. The imaging unit 31 is electrically connected to a circuit board (not shown) and further connected to an external connecting port (not shown). The other end of the cylinder 1C is provided with a rotating module 2C. The rotating module 2C is provided with a viewing window 13C. The rotating module 2C includes a rotor unit 22C and at least one stator unit 21C. The stator unit 21C is annularly disposed on an outer side of the cylinder 1C. The stator unit 21C is wound with an energizable coil 211C. The rotor unit 22C is formed in an annular shape and surrounds the cylinder 1C, and is pivotally connected to the cylinder 1C through a bearing 23C. A permanent magnet 24C is provided on the rotor unit 22C at a position opposite to the stator unit 21C. Accordingly, when the coil 211C on the stator unit 21C is energized, an induced magnetic field is generated, and by interaction with the magnetic force of the permanent magnet 24C, the rotor unit 22C can be rotated relative to the cylinder 1C.

One end of the rotor unit 22C is provided with a wiper 226C having a blade 227C extending from the wiper 226C. The blade 227C is in contact with the viewing window 13C. Accordingly, when the rotor unit 22C is driven and rotated, the wiper 226C will be turned synchronously, so that the blade 227C brushes the viewing window 13C back and forth, and water droplets attached to the viewing window 13C can be removed.

Furthermore, the rotor unit 22C has a first block 221C, a second block 222C, and a third block 223C. The three blocks are threadedly connected in sequence. Wherein, the bearing 23C is connected to the first block 221C. The permanent magnet 24C is disposed on the second block 222C. The wiper 226C is fixed on the third block 223B.

Figure 6:
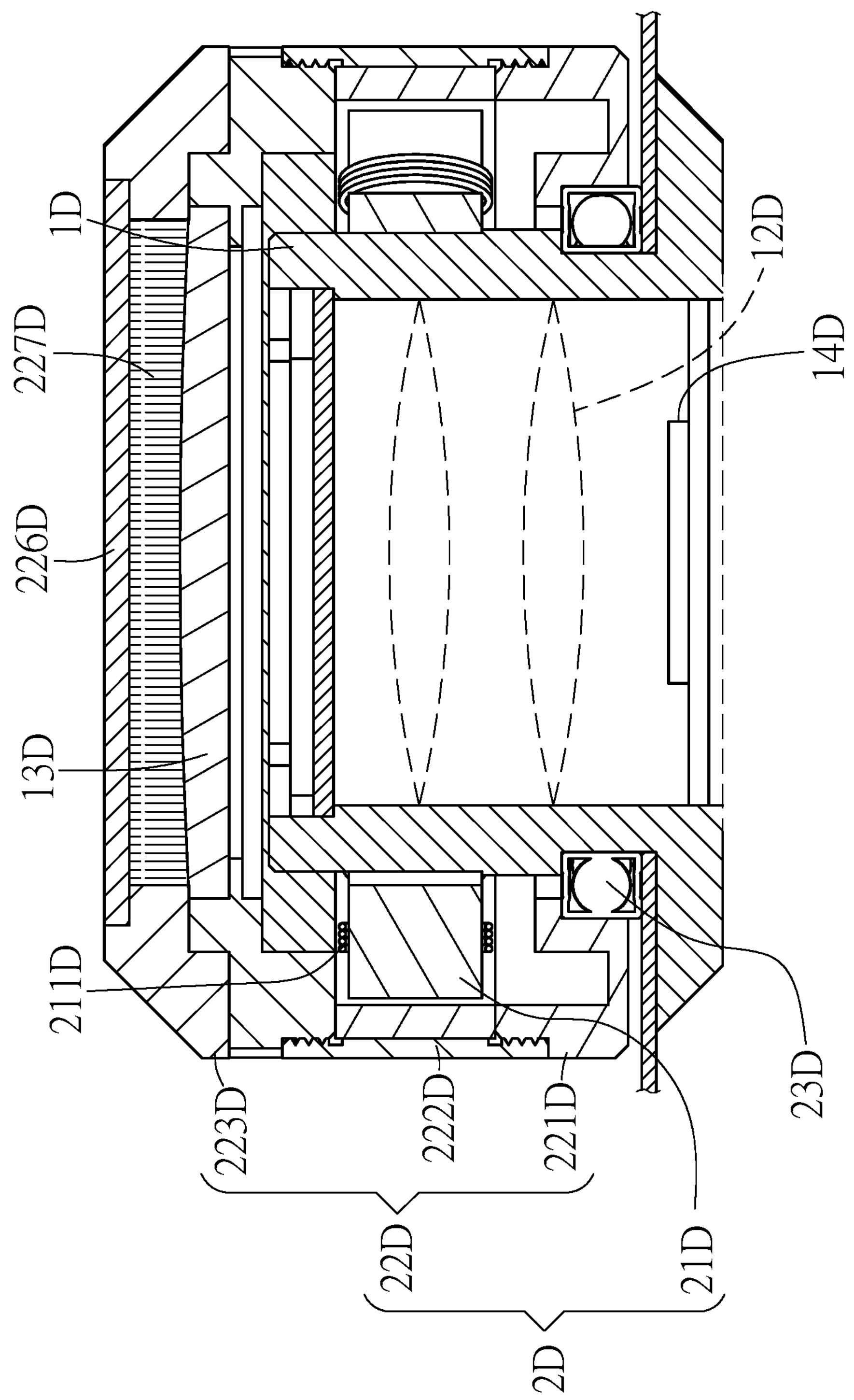
FIG. 6 is a sectional view in accordance with a fourth embodiment of the present invention.

FIG. 6 shows a fourth embodiment of the present invention, which is a built-in decontamination apparatus as the first embodiment. This embodiment is based on the foregoing second embodiment and has a slight structural change. The decontamination apparatus comprises a cylinder 1D as a lens housing, and an imaging lens assembly 12D composed of a plurality of lenses is accommodated in the interior of the cylinder 1D. The cylinder 1D further includes an imaging chipset 14D therein. The imaging chipset 14D is electrically connected to a circuit board (not shown) and further connected to an external connecting port (not shown). One end of the cylinder 1D is provided with a rotating module 2D. The rotating module 2D is provided with a viewing window 13D. The rotating module 2D includes a rotor unit 22D and at least one stator unit 21D. The stator unit 21D is annularly disposed on an outer side of the cylinder 1D. The stator unit 21D is wound with an energizable coil 211D. The rotor unit 22D is formed in an annular shape and surrounds the cylinder 1D, and is pivotally connected to the cylinder 1D through a bearing 23D. A permanent magnet 24D is provided on the rotor unit 22D at a position opposite to the stator unit 21D. Accordingly, when the coil 211D on the stator unit 21D is energized, an induced magnetic field is generated, and by interaction with the magnetic force of the permanent magnet 24D, the rotor unit 22D can be rotated relative to the cylinder 1D.

One end of the rotor unit 22D is provided with a wiper 226D having a blade 227D extending from the wiper 226D. The blade 227D is in contact with the viewing window 13D. Accordingly, when the rotor unit 22D is driven and rotated, the wiper 226D will be turned synchronously, so that the blade 227D brushes the viewing window 13D back and forth, and water droplets attached to the viewing window 13D can be removed.

Furthermore, the rotor unit 22D has a first block 221D, a second block 222D, and a third block 223D. The three blocks are threadedly connected in sequence. Wherein, the bearing 23D is connected to the first block 221D. The permanent magnet 24D is disposed on the second block 222D. The wiper 226D is fixed on the third block 223D.

Figure 7:
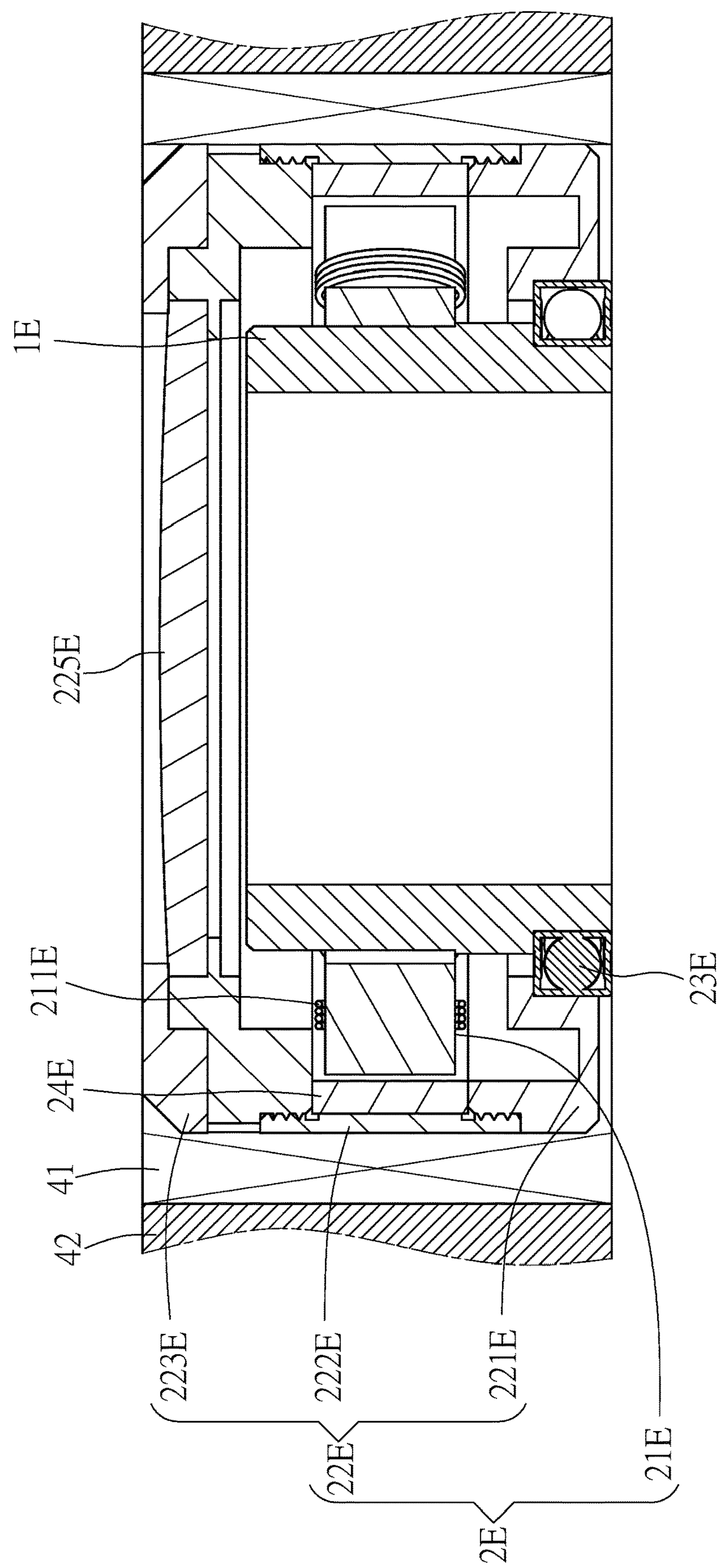
FIG. 7 is a sectional view in accordance with a fifth embodiment of the present invention.

FIG. 7 shows a fifth embodiment of the present invention, which is applied to a viewing window structure, such as a viewing window of a CNC automatic processing machine. In this embodiment, the decontamination apparatus is disposed in a partition wall 42 through a bearing 41, and comprises a cylinder 1E. The cylinder 1E is provided with a rotating module 2E. The rotating module 2E includes a rotor unit 22E and at least one stator unit 21E. The stator unit 21E is annularly disposed on an outer side of the cylinder 1E. The stator unit 21E is wound with an energizable coil 211E. The rotor unit 22E is formed in an annular shape and surrounds the cylinder 1E, and is pivotally connected to the cylinder 1E through a bearing 23E. A permanent magnet 24E is provided on the rotor unit 22E at a position opposite to the stator unit 21E. Accordingly, when the coil 211E on the stator unit 21E is energized, an induced magnetic field is generated, and by interaction with the magnetic force of the permanent magnet 24E, the rotor unit 22E can be rotated relative to the cylinder 1E.

In this embodiment, the rotor unit 22E has a first block 221E, a second block 222E, and a third block 223E. The three blocks are threadedly connected in sequence. Wherein, the bearing 23E is connected to the first block 221E. The permanent magnet 24E is disposed on the second block 222E. The third block 223B is provided with a viewing window 225E.

With the above structure, when the cutting fluid of the automatic processing machine is sprayed onto the viewing window 225E, the viewing window 225E can be rotated along with the rotation of the rotor unit 22E, and then the oil stains on the viewing window 225E can be removed to achieve a good view.

Figure 8:
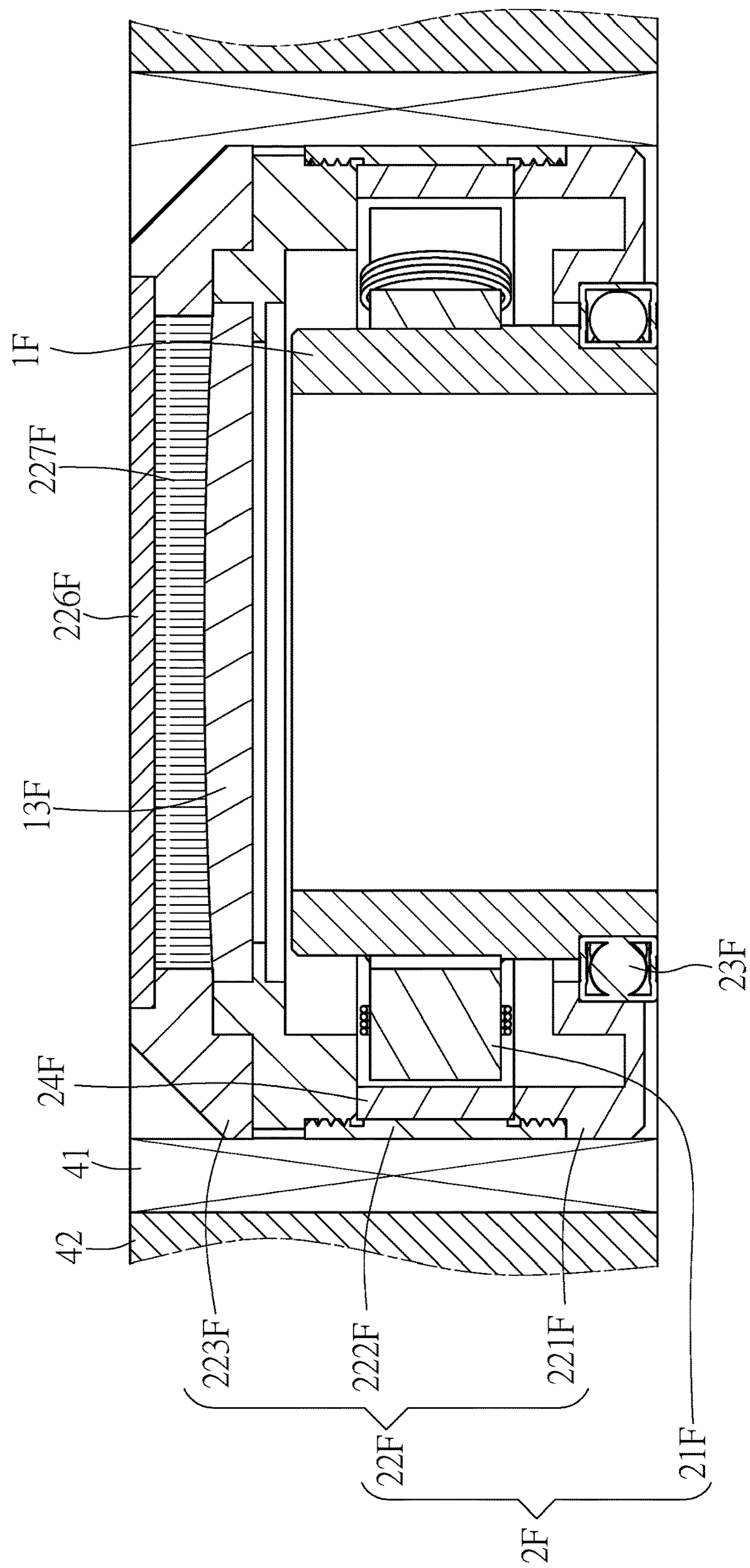
FIG. 8 is a sectional view in accordance with a sixth embodiment of the present invention.

FIG. 8 shows a sixth embodiment of the present invention, which is applied to a viewing window structure, such as a viewing window of a CNC automatic processing machine. In this embodiment, the decontamination apparatus is disposed in a partition wall 42 through a bearing 41, and comprises a cylinder 1F. One end of the cylinder 1F is provided with a viewing window 13F. The cylinder 1F is provided with a rotating module 2F. The rotating module 2E includes a rotor unit 22F and at least one stator unit 21F. The stator unit 21F is annularly disposed on an outer side of the cylinder 1F. The stator unit 21F is wound with an energizable coil 211F. The rotor unit 22F is formed in an annular shape and surrounds the cylinder 1E, and is pivotally connected to the cylinder 1F through a bearing 23F. A permanent magnet 24F is provided on the rotor unit 22F at a position opposite to the stator unit 21F. Accordingly, when the coil 211F on the stator unit 21F is energized, an induced magnetic field is generated, and by interaction with the magnetic force of the permanent magnet 24F, the rotor unit 22F can be rotated relative to the cylinder 1F.

In this embodiment, the rotor unit 22F has a first block 221F, a second block 222F, and a third block 223F. The three blocks are threadedly connected in sequence. Wherein, the bearing 23F is connected to the first block 221F. The permanent magnet 24F is disposed on the second block 222F. The third block 223B is provided with a wiper 226F having a blade 227F extending from the wiper 226F. The blade 227CF is in contact with the viewing window 13F.

With the above structure, when the cutting fluid of the automatic processing machine is sprayed onto the viewing window 13F, the wiper 226 can be turned along with the rotation of the rotor unit 22F, so that the blade 227F brushes the viewing window 13F back and forth to remove the oil stains on the viewing window 13F to achieve a good view.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A decontamination apparatus for a viewing window, comprising:

a cylinder; and a rotating module, disposed at one end of the cylinder and connected with a viewing window; wherein the rotating module can be driven to rotate, which further drives the viewing window to rotate for removing dirt attached to the viewing window, wherein the rotating module includes a rotor unit and at least one stator unit; the stator unit is fixed to an outer side of the cylinder and wound with an energizable coil; the rotor unit is pivotally connected to the cylinder, the viewing window is fixed on the rotor unit, and the rotor unit is provided with a permanent magnet opposite to the stator unit, wherein a bearing is provided between the rotor unit and the cylinder, and wherein the rotor unit includes a first block, a second block and a third block threadedly connected in sequence; the first block is connected with the bearing, the second block is connected with the permanent magnet, and the third block is connected with the viewing window; wherein the first block, the second block, and the third block are all formed as an annular shape, the bearing is socketed to the cylinder, the first block is rotatable relative to the cylinder via the bearing, the second block is threadedly connected on an upper end of the first block, the permanent magnet is attached on the side of the second block and is faced to the stator unit, the third block is threadedly connected on an upper end of the second block, the viewing window is socketed to the third block, therefore the second block and the third block are rotatable relative to the cylinder via the first block, and wherein a water drain gap is formed between a lens and a bottom end of the first block.

* * * * *